W. M. FROST

Dec. 22, 1931. INSECT TRAP Re. 18,294

Original Filed Nov. 15, 1927

Inventor
William M. Frost
By Herbert E. Smith,
Attorney

Reissued Dec. 22, 1931 Re. 18,294

UNITED STATES PATENT OFFICE

WILLIAM M. FROST, OF SPOKANE, WASHINGTON, ASSIGNOR TO FROST ELECTRIC SCREEN CO., OF SPOKANE, WASHINGTON, A CORPORATION OF WASHINGTON

INSECT TRAP

Original No. 1,743,664, dated January 14, 1930, Serial No. 233,403, filed November 15, 1927. Application for reissue filed November 24, 1930. Serial No. 497,942.

My present invention relates to insect traps of the electrocuting type, and particularly to devices in which cage-like or grid-like electrodes of opposite polarity are so formed and positioned that insects coming into contact with the opposed electrodes will be electrocuted.

One of the principal objects of my invention is the provision of a device of this general character which will present relatively large surface areas of opposed electrodes combined with relatively narrow intervening passages, and which will produce unusually effective and satisfactory results in the trapping and electrocution of insects. These results are attained through the novel construction and arrangement of the parts of the device constituting my invention, and principally through the use of electrodes including spaced alternating blades. In its more specific aspects, my invention pertains to details of construction and arrangement of its parts, and particularly of the electrodes.

Devices constructed according to the principles of my invention may be manufactured conveniently and at comparatively low cost, are of compact form and attractive appearance, possess great durability, and are capable of greatly increased efficiency.

The device illustrated as the preferred embodiment of my invention comprises a trap of cage-like form produced by electrodes of novel configuration and arrangement. This electrocuting cage-like trap is designed to be connected in a suitable manner to a source of current, usually through a conveniently located transformer, and is preferably attached to a support. In the particular embodiment illustrated, the support to which the electrocuting cage is attached is in the form of a housing for a transformer, and is adapted to be suspended in suitable locations either indoors or outdoors.

If desired, the trap may be equipped with a lure for attracting insects. The lure may be a lamp or a bait. Either or both may be employed, and provision has been made therefor in the device illustrated, but the trap which constitutes my invention is complete and operative as an electric insect trap without the introduction of insect attracting devices or lure elements therein.

The nature of the invention and its various objects and advantages will be more clearly understood from the description and drawings, wherein I have disclosed a device embodying my novel ideas and improvements.

Figure 1:
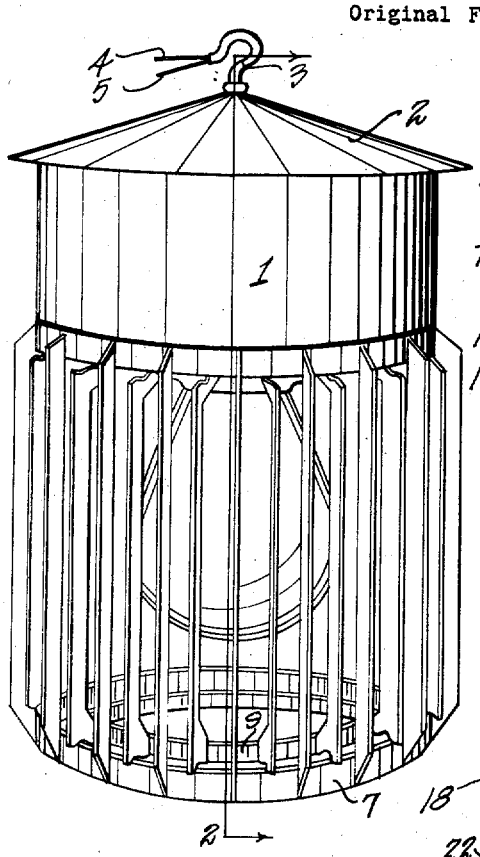
Figure 2:
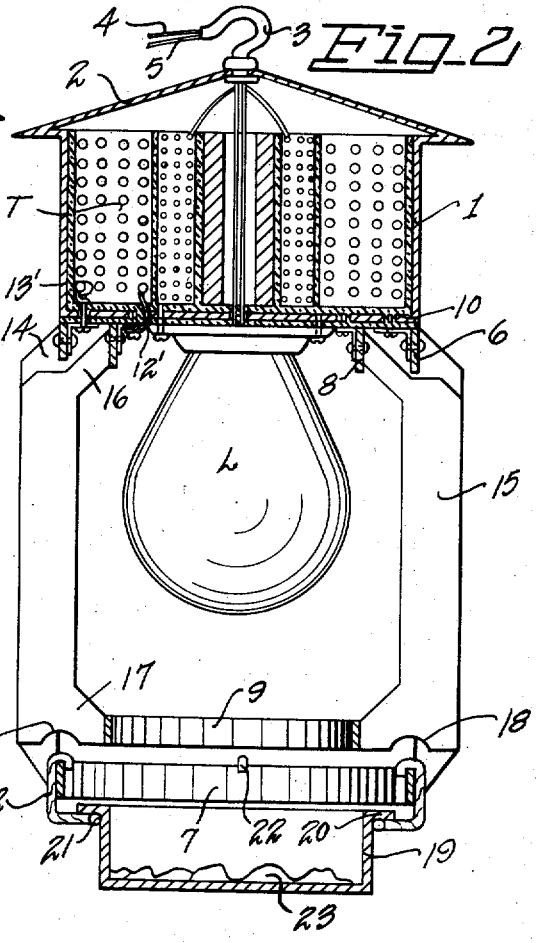
Figure 3:
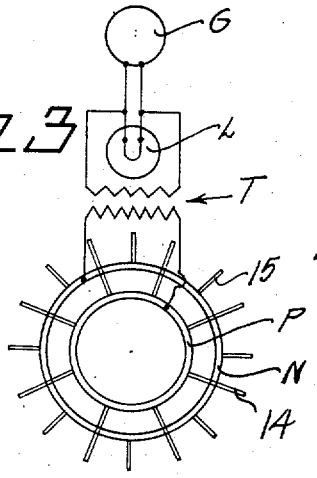
Figure 4:
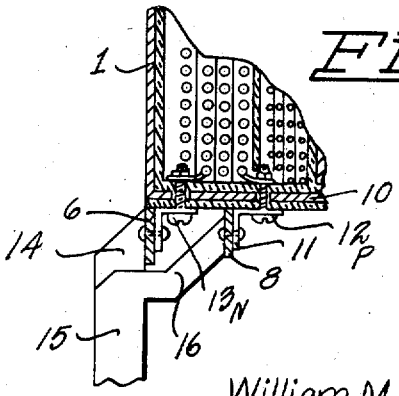

In the drawings, wherein like reference numerals refer to like parts in the several views, Figure 1 is a perspective view of the preferred form of insect electrocuting trap involving my invention, Figure 2 is a central vertical sectional view taken on line 2—2 of Fig. 1, and showing a bait supporting device attached to the trap, Figure 3 is a diagrammatic horizontal sectional view on a line through the center of Fig. 2, this view also showing diagrammatically the arrangement of the electrical parts of the device, and Figure 4 is an enlarged detail of the sectional view shown in Fig. 2.

The device illustrated is essentially a cage or trap comprising a pair of cage-like electrodes including a plurality of blades, the blades 14 of one electrode being arranged in spaced alternating relation with the blades 15 of the other electrode. The blades are respectively attached at their ends to concentrically disposed rings or bands located at the opposite ends of the cage. In the preferred form of the device illustrated, the blades are disposed in vertical planes and connect upper and lower electrode rings or bands, blades 15 being attached to upper and lower inner rings or bands 8 and 9 and blades 14 to upper and lower outer rings 6 and 7. The blades of each electrode extend outwardly in a radial direction from their respective end rings or bands, blades 15, which connect the inner rings or bands 8 and 9 projecting between and overlapping adjacent blades 14 of the opposite electrode. Preferably the outer edges of all of the blades 14 and 15 are in the same plane, blades 14 interrupting the passages between blades 15 at their outer portion. The inner ring 9, connected to the lower ends of blades 15, is set in a plane above the outer ring 7.

The cage-like electrodes, for convenience in handling and use, are attached to a support, which in the preferred construction is at the upper end of the electrodes. This support may take the form of a cylindrical housing 1 adapted to enclose a transformer T. The top 2 of the housing may be conical, as illustrated, and may be provided with a suspending hook 3 of tubular construction to accommodate wires 4, 5 from the source of current to the transformer and to a lamp L.

The upper pair of concentric electrode rings or bands 6 and 8 are preferably attached by means of brackets 11 to a plate 10 of insulating material upon the bottom of the housing or support 1. Rings or bands 6 and 8 are insulated from each other by insulation plate 10, and respectively connected to the transformer T by screws 13 and 12 which pass through the brackets into the coils of the transformer to which they are connected by conductor wires 13′, 12′. The connections are such as to supply current of opposite polarity from a suitable source (e. g., a generator G) to the electrodes. One of the electrodes, for example, electrode P, carrying blades 15, may be considered the positive and the other electrode N, carrying blades 14, as the negative.

Blades 15 have attaching angle members 16 and 17 at their respective ends, by means of which the blades 15 are projected outwardly from the inner rings 8 and 9 to an extent sufficient to place them in overlapping or complementary relation to blades 14. The lower end of each blade 15, formed with the integral attaching lug or angle member 17, may be provided with an arcuate notch 18, directly above ring 7, which forms deflecting or guiding edges to prevent drops of water on the blade from dripping down to ring 7, any moisture upon blades 15 thus being caused to drip therefrom either within or outside of the ring.

With the arrangement of the blades of the trap farther apart at their outer than at their inner edges, and with blades of opposite polarity alternating in spaced overlapping relation, a fly or other insect may enter the space between adjacent blades, but its body or wings touching adjoining blades will cause its electrocution. Even if insects were to reach the inside of the trap through its bottom when it is suspended with its bottom open, as shown in Fig. 1, they would in most instances be electrocuted by coming into contact with the inner edges of adjoining blades while flying about within the trap. By reason of the smooth surfaces of blades 14 and 15, the insects electrocuted cannot cling to the sides of the blades, but will fall between the blades and out of the trap.

The efficiency of the device may be increased by the use of some means of attracting insects, a lamp being especially useful at night and a bait in daylight. In the drawings I have illustrated means for supporting both types of lure within the cage in such manner that either or both of them may be inserted, or the trap used without any such attracting means, as may be desired. A socket for an electric lamp L, with suitable electrical connections, may be provided on the under side of the support or housing 1, the lamp being inclosed within the cage formed by blades 14 and 15. The drawing also shows a convenient means of supporting a bait 23 of a material suitable for attracting insects, this means comprising a pan 19, provided with an exterior flange 20 adapted to rest upon a ring or band 21 hung upon electrode ring or band 7 by hooks 22. So placed, the bait cannot be reached by insects except by entrance through the spaces between the blades of the trap.

I claim:

1. The combination in an electrocuting trap with a transformer and a housing therefor, of a trap in the form of a cage comprising a pair of spaced concentric upper rings and a pair of spaced inner and outer lower rings, the smaller of the lower rings being located above the larger ring, and radially extending, alternately arranged, positive and negative blades connecting the pair of outer rings and the pair of inner rings.

2. The combination in an electrocuting trap with a housing having a conical top and a suspending hook and an electrical transformer in the housing, of a pair of inner and outer rings attached at the under side of the housing, a pair of spaced inner and outer rings, the inner one of which is located above the lower one, alternately arranged and radially extending positive and negative blades connecting the upper and lower rings in pairs, said blades forming a cage, and a bait-containing receptacle supported beneath said cage.

3. An electric insect trap in the form of a cage comprising a pair of spaced concentric upper rings, a pair of spaced inner and outer lower rings, the inner of the lower rings being located above the outer ring, and radially extending, alternately arranged, positive and negative blades connecting the pair of outer rings and the pair of inner rings.

4. An electric insect trap comprising a support, an upper pair of spaced concentric rings attached to said support, a lower pair of spaced inner and outer rings the inner one of which is located above the outer one, alternately arranged and radially extending positive and negative blades connecting the upper and lower rings in pairs, said blades forming a cage.

5. An electric insect trap in the form of a cage comprising a pair of spaced concentric upper rings insulated from each other, a pair of spaced inner and outer lower rings the inner of which is located above the outer ring, and radially extending blades connecting the pair of outer rings and relatively shorter, wider blades connecting the pair of inner rings and projecting outwardly between the spaced pair of outer rings.

6. An electric insect trap in the form of a cage comprising a pair of spaced concentric upper rings insulated from each other, a pair of spaced inner and outer lower rings the inner of which is located above the outer ring, outwardly projecting radial blades connecting the pair of outer rings and relatively shorter and wider blades connecting the pair of inner rings and projecting outwardly between said pair of outer rings, said blades forming positive and negative cage-like electrodes, the blades of the respective electrodes being disposed in spaced, alternating, overlapping relation.

7. The combination in an insect electrocuting trap with a transformer and a housing therefor, of a trap in the form of a cage comprising a pair of spaced inner and outer upper bands and a pair of spaced inner and outer lower bands, the inner of said lower bands being located above the outer, and radially extending, alternately arranged, positive and negative blades connecting the pair of outer bands and the pair of inner bands.

8. The combination in an insect electrocuting trap with a transformer and a housing therefor, of a trap in the form of a cage comprising a pair of spaced concentric upper bands and a pair of spaced inner and outer lower bands, and radially extending, alternately arranged, positive and negative blades connected to and projecting outwardly from the pair of outer bands and the pair of inner bands in spaced overlapping relation.

9. An electric insect trap in the form of a cage comprising a pair of spaced inner and outer bands at one end of the cage, a pair of spaced inner and outer bands at the opposite end of the cage, outwardly extending blades connecting the outer bands and blades connecting the inner bands extending outwardly therefrom and disposed in spaced alternating relation between the blades connecting the outer bands.

10. An electric insect trap in the form of a cage comprising a pair of spaced concentric rings at one end of the cage, a pair of spaced inner and outer rings at the opposite end of the cage, outwardly extending radial blades connecting the outer rings and radial blades connecting the inner rings extending outwardly therefrom and disposed in spaced alternating relation between the blades connecting the outer rings, the outer edges of the blades connecting the inner and outer rings being in substantially the same plane.

11. An electric insect trap comprising cage-like electrodes, one within the other, said electrodes including spaced alternately disposed blades, the blades of each electrode extending outwardly.

12. An electric insect trap comprising cage-like electrodes, one within the other, each of said electrodes including outwardly extending blades, the blades of the respective electrodes being disposed in spaced alternating overlapping relation.

13. An electric insect trap comprising a pair of cage-like electrodes, each including spaced outwardly extending outwardly diverging blades, the blades of one of said electrodes being disposed in spaced alternating arrangement between the blades of the other electrode.

14. In an electric insect trap, the combination with a support, of a trap portion attached to said support and comprising a pair of cage-like electrodes located one within the other, said electrodes including alternately spaced radial blades extending in the same radial direction into overlapping relation.

15. An electric insect trap comprising a support and a pair of cage-like electrodes attached only at their upper ends to said support, said electrodes including vertically disposed blades arranged in spaced alternating overlapping relation.

16. An electric insect trap comprising a cage-like electrode formed of longitudinally spaced electrode members and spaced radial blades connecting said members, and projecting outwardly therefrom, a second cage-like electrode formed of longitudinally spaced electrode members and spaced radial connecting blades, projecting outwardly therefrom, one of said electrodes being disposed within and insulated from the other, the blades of the respective electrodes being arranged in spaced alternating relation and the blades of one electrode overlapping the blades of the other electrode.

17. An electric insect trap comprising a support, a plurality of spaced radially arranged positive electrode blades attached to said support, and a plurality of radially arranged negative electrode blades attached to said support, said positive and negative blades being positioned in spaced alternating relation with their outer edges flush.

18. An electric insect trap comprising a support, spaced radially arranged electrode blades attached to and projecting outwardly beyond said support, and radially arranged electrode blades of opposite polarity attached to said support inwardly of the points of support of the first-mentioned blades and projecting outwardly into flush relation therewith, said blades being disposed in spaced alternating relation.

19. An electric insect trap comprising a pair of spaced concentric upper rings, a pair of spaced lower rings, and vertically disposed radially extending alternately spaced blades connecting the pair of outer rings and the pair of inner rings, each of the blades connecting the inner rings having angular end portions offsetting the blade outwardly from the plane of the connected rings.

20. An electric insect trap comprising a support, concentric substantially cylindrical cage-like electrodes concentrically arranged on said support, each of said electrodes including radial blades, the blades of one electrode being disposed in spaced relation between the blades of the other electrode.

21. An electric insect trap comprising concentric substantially cylindrical electrodes, each electrode including spaced radial blades, the blades of one electrode being disposed in spaced alternating relation to the blades of the other electrode.

22. In an electric insect trap, the combination with a support, of substantially cylindrical cage-like electrodes located one within the other, each electrode being attached at one end to said support and open at its opposite end, said electrodes including alternately spaced positive and negative inwardly converging blades.

23. In an electric insect trap, the combination with a support, of substantially cylindrical cage-like electrodes located one within the other and attached to said support only at one end, said electrodes including alternately spaced positive and negative blades.

24. An electric insect trap comprising a pair of substantially cylindrical cage-like electrodes, said electrodes including spaced blades disposed edgewise in spaced alternating relation.

25. An electric insect trap comprising substantially cylindrical cage-like electrodes one within the other, each electrode including spaced blades, the blades of one electrode extending between the blades of the other electrode in spaced relation.

26. An electric insect trap comprising substantially cylindrical cage-like electrodes, one within the other, said electrodes including spaced alternately disposed blades converging inwardly.

WILLIAM M. FROST.